United States Patent [19]

Burd

[11] Patent Number: 5,337,955
[45] Date of Patent: Aug. 16, 1994

[54] COMBINED BOILER WATER TEMPERATURE CONTROL

[76] Inventor: Alexander L. Burd, 489 Bader St., Green Bay, Wis. 54302

[21] Appl. No.: 31,350

[22] Filed: Mar. 12, 1993

Related U.S. Application Data

[63] Continuation-in-part of Ser. No. 852,993, Mar. 16, 1992, abandoned.

[51] Int. Cl.⁵ .............................................. F24D 3/00
[52] U.S. Cl. ................................ 236/91 F; 236/91 B
[58] Field of Search ............... 236/91 R, 91 F, 91 B, 236/91 E, 78 D, 46 R, 46 A, 9 A, 9 R; 237/8 A, 8 R

[56] References Cited

U.S. PATENT DOCUMENTS

| | | | |
|---|---|---|---|
| 2,898,047 | 8/1959 | Gaddis | 236/91 E X |
| 3,408,004 | 10/1968 | Miller | 236/9 |
| 3,979,710 | 9/1976 | Jespersen | 236/91 F X |
| 4,108,375 | 8/1978 | Keeney | 236/91 F X |
| 4,290,551 | 9/1981 | Johnstone | 236/9 R |
| 4,542,849 | 9/1985 | Pichot et al. | 236/46 R X |
| 4,557,417 | 12/1985 | Ruby | 236/46 R |
| 4,585,165 | 4/1986 | Iverson | 236/91 F X |
| 4,637,349 | 1/1987 | Robinson | 237/8 R |
| 4,793,553 | 12/1988 | Berman | 236/91 R |

Primary Examiner—Harry B. Tanner

[57] ABSTRACT

This invention provides an arrangements for the method of control of a boiler heating capacity for a hydronic heating system, which is recommended for a heat supply to a single building or to a group of buildings. The control of heating system capacity is provided by changing the boiler supply hot water temperature inversely with the outside air temperature measured by a momentary temperature sensor and transformed by a temperature converter. The control is achieved by changing fuel supply to a burner of a boiler proportionally to a disagreement between a boiler supply water temperature and determined value of the outside air temperature. It is, however, obvious that the same method of control can be used for steam boilers and for chillers to control buildings space heating and space cooling as well.

6 Claims, 6 Drawing Sheets

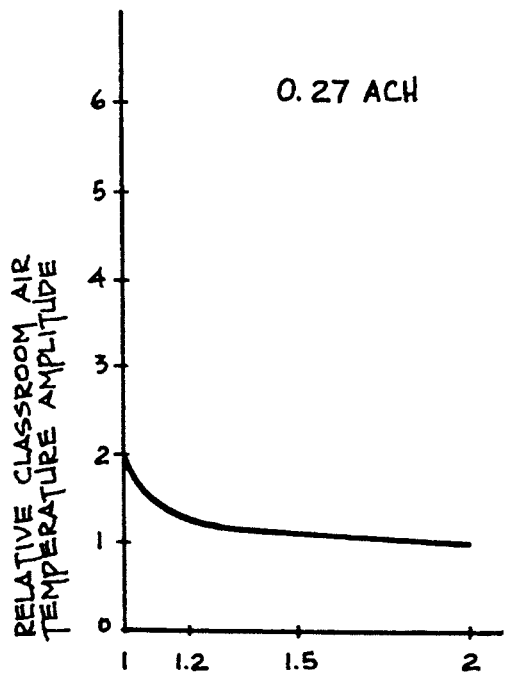 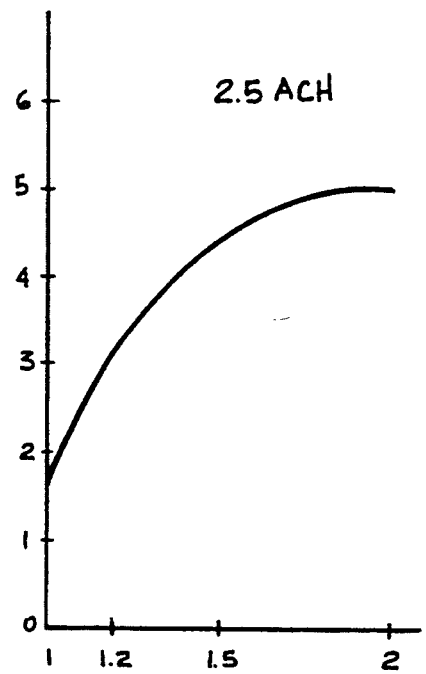

COMBINED BOILER WATER TEMPERATURE CONTROL

CROSS REFERENCE TO RELATED APPLICATION

There is a pending application to which the present invention is related. The pending application Ser. No. is 07/852,993 and its filing date is Mar. 16, 1992, now abandoned, art unit 3404. The present application is presented as the continuation in part of the shown above application number.

BACKGROUND OF THE INVENTION

This invention is related to the control of space heating system with the forced circulation of hot water from the central heating source to a space heating units. An object of invention is to solve the problem of discrepancy between building space heating losses and heat supply and to improve building comfort while reducing fuel consumption and saving energy.

The main purpose of space heating system is to provide the desired inside room air temperature at different outside conditions. In general, the building room heat losses change proportionally to the difference between the room and outside air temperatures. This is true when the consideration is taken for a building steady state heat mode, for example, for a daily average outside air temperature. For current outside temperature conditions it is not necessarily so because the outside air temperature changes during a day making an oscillation around the daily averaged air temperature. Some of the components of a building heat losses do not immediately follow these momentary air temperature changes, among them are heat losses through the outside inertial exposures such as walls, floor, roof. Meanwhile, heat losses by a non inertial exposures such as windows, doors and by infiltration and ventilation - exactly follow the change of momentary outside air temperature. The total building heat losses, due to the impact of unsteady state heat mode, for the most of the time, do not follow the momentary outside air temperature changes, however, these factors generally are not considered. In practice, because of the thermal inertia of building's exposures and heating systems the heat supply provided from the heating system differs from the heat loss of the room, causing the deviation of room air temperature from its design conditions. The closer the amount of heat supply is to the amount of heat losses in the room, the less this deviation will be and, as a result, there will be more comfortable room conditions and there will be less fuel spent, when the other conditions are assumed as equal. The sample of illustration of influence of building thermal inertia on the room air temperature oscillation is shown in the FIGS. 1a, 1b and 1c. The data shown in these figures is related to the typical classroom in a school building which has a medium inertial construction. The infiltration rate for the room is 0.27 air change per hour (ACH). In FIG. 1a the daily changes of outside air temperature are shown. The design value of oscillation amplitude of outside air temperature is assumed as 11° F. It is not uncommon to find much greater value of design outside air temperature oscillation amplitude in a real conditions. It may become as much as two-three times higher than the value taken in this example. Also, in this figure the oscillation of room space heating losses and room space heating supply (following the momentary outside air temperature changes) are shown. It is seen that heat supply and heat losses do not concur with each other. This is because the room heat losses do not follow the momentary changes of outside air temperature due to the room thermal response. Although the room heat losses have an insignificant time lag, compare to the heat supply, their oscillation amplitude is less than the amplitude of heat supply in 1.6 times (FIG. 1b). The discrepancy between these two is shown by the dashed line which represents subtraction of heat losses from the heat supply. This resulted in a room air temperature amplitude (FIG. 1c) which is close to 0.5° F. (room air temperature departure from its design value). In FIGS. 2a and 2b the results of calculation of classroom temperature oscillation amplitude for the different control strategies and for the different values of ACH are given. The control of heat supply is done following to a momentary outside air temperature changes ($N_{M.O.}=1$) or to a temperature of the suggested device—outside air temperature converter (load anticipator), which is characterized by a change of $N_{S.D.}$ value from 1.2 to $N_{S.D.}=2$ (that is equivalent to the artificial decreasing of outside air temperature oscillation amplitude, respectively in 1.2 and 2 times). For the convenience of analysis the changes of room temperature are given as a relative values (the ratio of considered value to the value, which is conditionally assumed as 1). It can be seen from the FIG. 2a than control of heat supply at 0.27 ACH by the temperature of the outside air temperature converter is more efficient than following a momentary outside air temperature. Optimal value $N_{S.D.}=2.0$ reduces the room air temperature oscillation in 1.7 times and leads to a better room comfort conditions. It can be proved, that the reduction of room air temperature fluctuation is directly translated to energy savings. This is so due to the elimination of undesirable room air temperature fluctuation below the comfort level. Otherwise, the temperature level in the room should be increased to satisfy a given comfort requirements. The calculations conducted for the same room (FIG. 2b) have shown that increasing the value of ACH to 2.5 (because of intensive operation of mechanical ventilation system) will switch the better control strategy from following the outside air temperature converter to a momentary outside air temperature $N_{M.O}=1$. In this particular case control by a momentary outside air temperature leads to a reduction of room temperature amplitude in comparison with suggested device. It can be shown, that when in the considered building mechanical ventilation is not used intensively (approximately 1.5 ACH), a space heating control following either momentary outside air temperature change or temperature of outside air temperature converter virtually gives the same level of comfort. For both control strategies a value of oscillation of room air temperature is quite similar.

From a given above analysis it is obvious, that combined boiler water temperature control with consideration of both steady state and unsteady state building heat modes provides the best results for a buildings with different levels of people occupancy during a day. In that type of buildings (schools and institutional buildings) people attendance changes from minimum (night time and weekends) to a maximum occupancy schedule (during weekdays). In periods with high ventilation load (maximum number of people attendance) the space heating control should be following the momentary outside air temperature measured by the exposed to ambient thermometer. At the same time, during the periods with lower level of people occupancy or when the buildings are closed it is beneficial to consider the building unsteady state heat mode and to use the outside air temperature converter for space heating control. During this particular time the boiler water temperature oscillation can be significantly reduced, in comparison with control following momentary outside air temperature, with a simultaneous fuel savings. For other buildings, such as apartment complexes, residential houses, commercial offices and etc., without mechanical ventilation the space heating control always should be implemented by following the values measured by an outside air temperature converter (load anticipator). As the calculation has shown, to match the unsteady state heat mode of majority of the buildings this load anticipator should be able to artificially reduce outside air temperature oscillation amplitude in 1.5-3 times. Also, the use of outside air temperature converter reduces the boiler overcontrol and eliminates otherwise frequent boiler cycling (from on to off) as the result of providing closer match of heat supply to the actual building heat losses. This will lead to energy savings due to the reduction of boilers' stand by losses. To total all that have been said above, the present invention will contribute: to a better building comfort conditions, to reduction of fuel consumption on space heating, to providing for a space heating system optimal operation, as well as for its dependability and durability.

BRIEF DESCRIPTION OF THE DRAWINGS

FIGS. 2a and 2b show the Influence of Different Control Strategies on Room Air Temperature Oscillation.

THE DESCRIPTION OF THE PREFERRED EMBODIMENTS

Figure 1A:
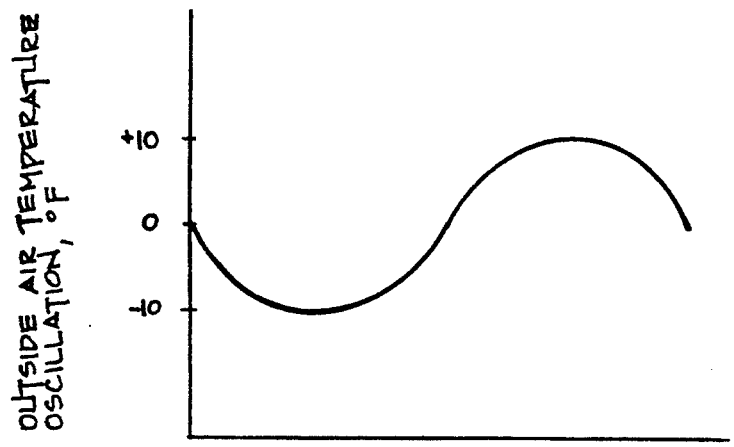
FIGS. 1a, 1b and 1c show the Influence of Building Thermal Inertia Properties on Room Air Temperature Oscillation.
Figure 1B:
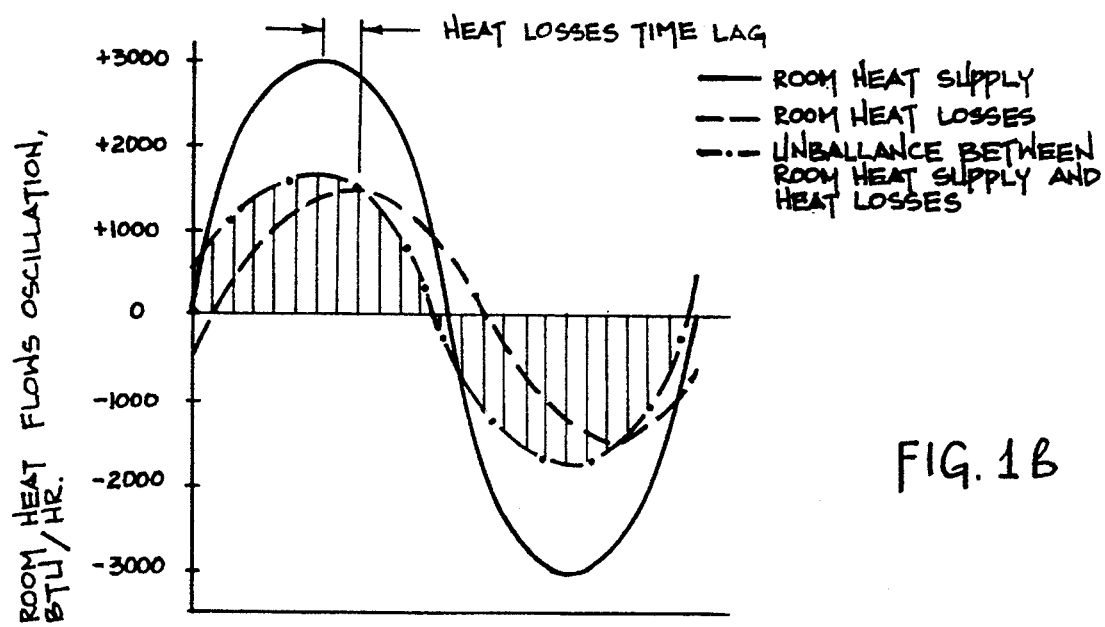
Figure 1C:
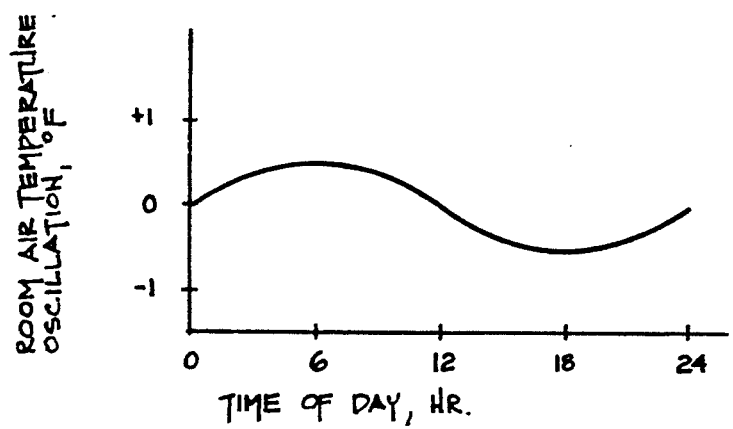
Figure 3:
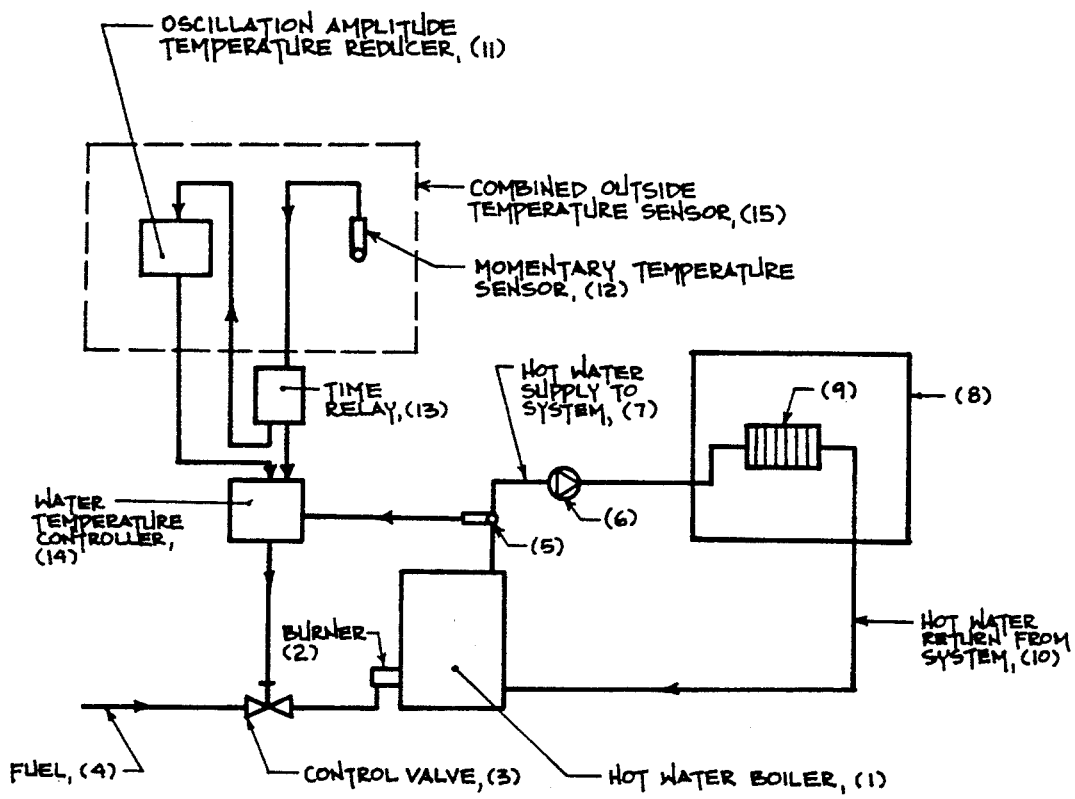
FIG. 3 shows a Diagrammatic Representation of a Space Heating Control System According to a Present Invention.

The invented control system is shown in FIG. 3. The system comprises the hot water boiler (1), the burner (2), the control valve (3) to change the amount of fuel (4) through the boiler, the temperature sensor (5) to measure the actual value of hot water supply temperature at the boiler outlet, the circulator (6) to circulate the hot water through the building's (8) space heating units (9), combined outside air temperature sensor (15)—the outside air temperature converter (load anticipator) (11)—Oscillation Amplitude Temperature Reducer (OATR), and the momentary outside air temperature sensor (12)—the temperature sensor exposed to the ambient air temperature, the time relay element (13) which follows the preset time schedule to switch the system control from the outside air temperature converter to the momentary air temperature sensor and vise versa, and the water temperature controller (14)—the device to compare the boiler outlet hot water temperature measured by temperature sensor (5) with the preset hot water temperature graph which changes according to outside air temperature value (temperature response control), the controller determines the difference between actual hot water temperature and its preset value and sends a signal which is proportional to a value of determined difference to change the degree of the valve (3) opening to change the fuel delivery rate to the burner (2) and, finally, as a result of these actions, the hot water supply temperature is changed to satisfy its predetermined temperature value. From FIG. 4 can be seen how the said outside air temperature converter transforms the actual outside air temperature oscillation value to the reduced value to better satisfy building heating mode. The actual absolute value of outside air temperature oscillation amplitude for the considered day is 15° F.+7° F.=22° F. and its value is reduced by OATR in 2 times and equals 9.5° F.+1.5° F.=11° F.

Figures 5A, 5B:
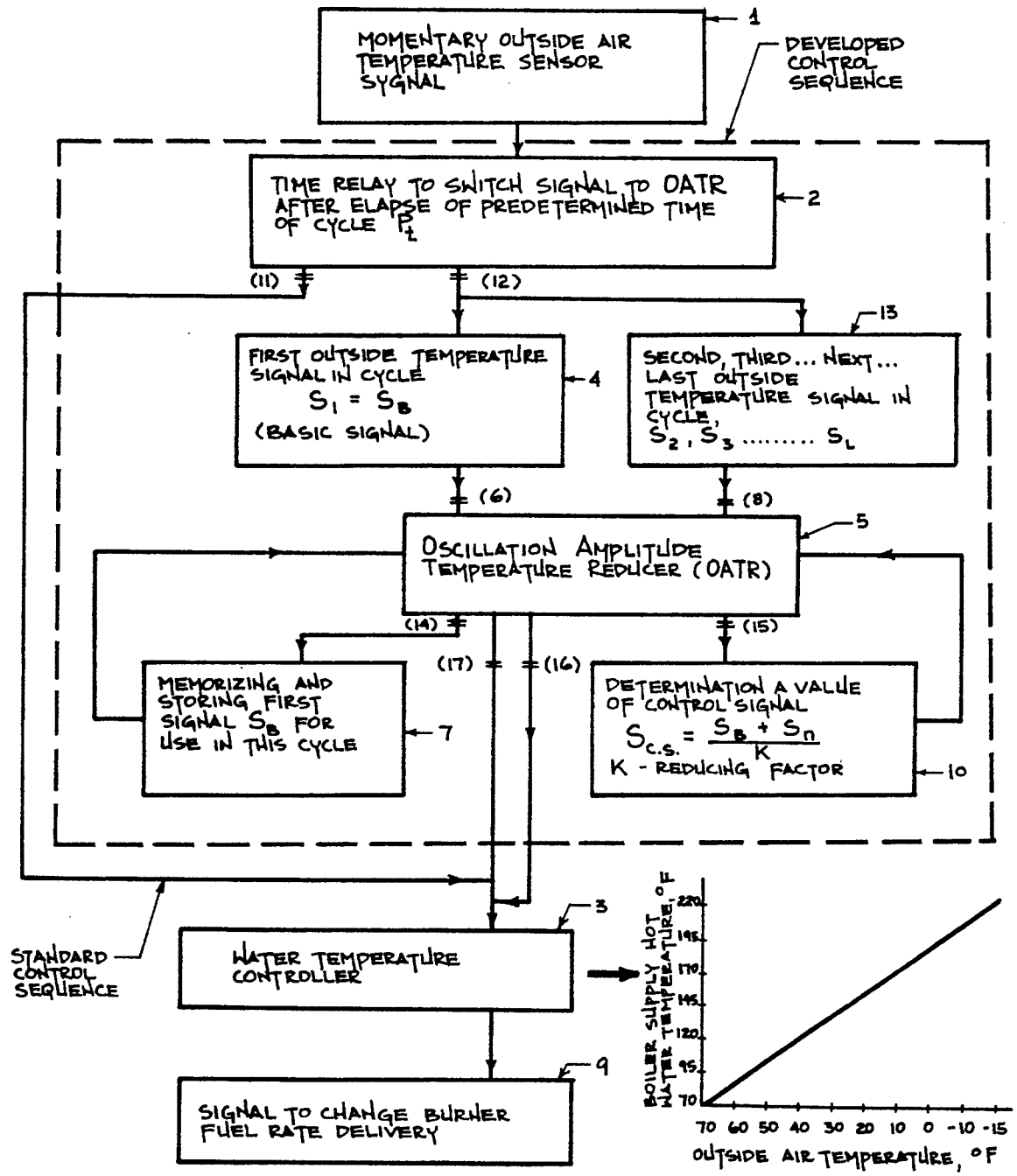
FIGS. 5a and 5b show the Flow Signal Diagram of Oscillation Amplitude Temperature Reducer.

The FIGS. 5a and 5b are provided to understand better how the Oscillation Amplitude Temperature Reducer (OATR) is functioning.

Figure 4:
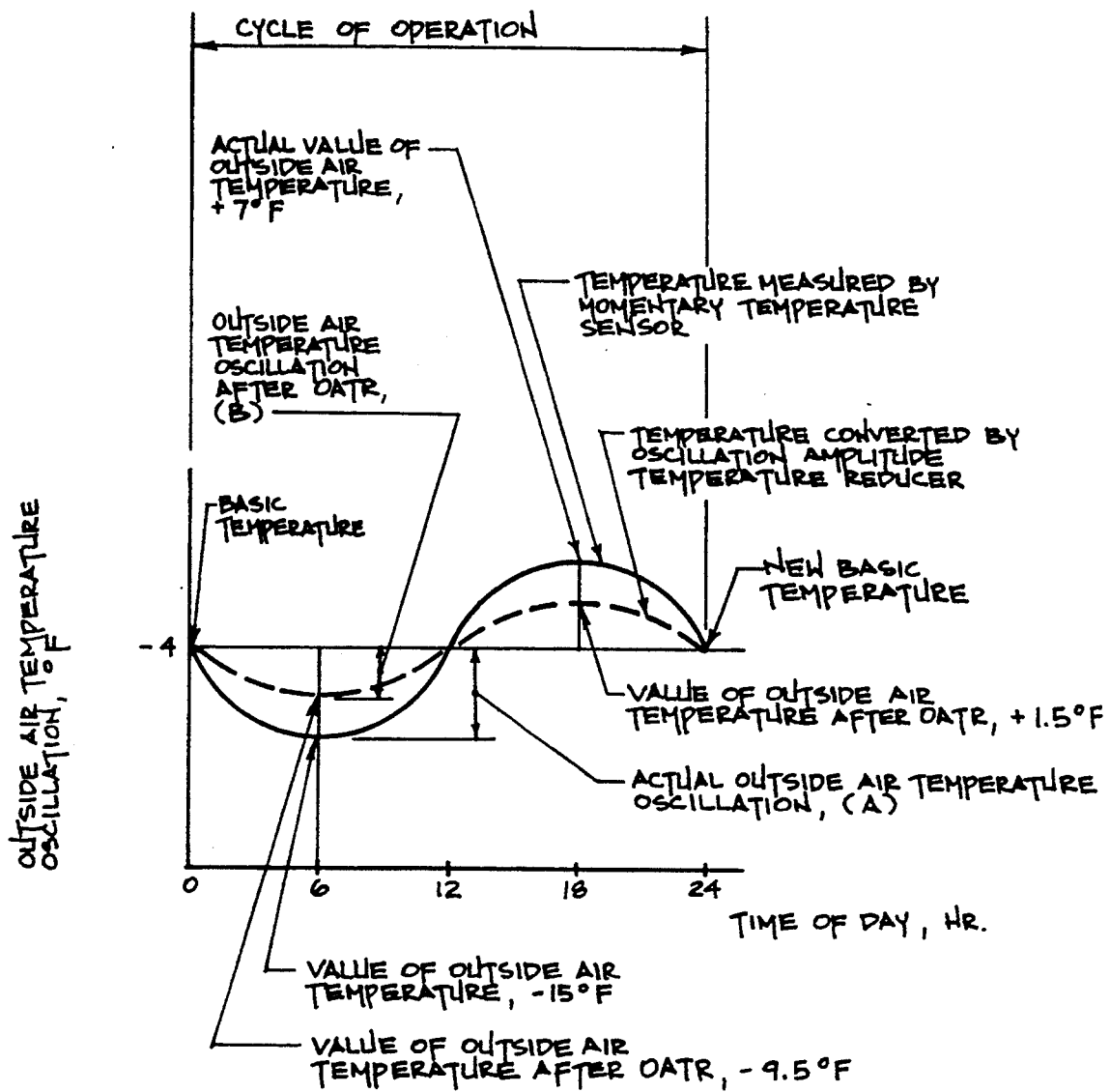
FIG. 4 shows the Actual Outside Air Temperature Oscillation Amplitude and Its Value After Transformation in Temperature converter—Oscillation Amplitude Temperature Reducer.

On a regular office hours from 8 A.M. to 5 P.M. (the time duration is given only for illustration) five days a week the building space heating control is implemented by using a standard control sequence (cycle #1, actually, this mode of system operation may cover a time period which is significantly shorter than the one shown in the example). This is done (FIG. 5a) by controlling the boiler hot water temperature following a momentary outside air temperature measured by sensor 1. The signal from the outlet (11) of time relay 2 is continuously sent to the inlet of water temperature controller 3, which changes the rate of fuel through the burner (9) to satisfy the required supply boiler water temperature. The boiler water temperature curve (graph) is shown in FIG. 5b. This curve (usually for simplification, a curve is substituted by a straight line) shows how the boiler water temperature should be changed to maintain a constant building design inside air temperature value at different outside air temperature values. It is well known that this curve will be different for a different space heating units (for example, converters, radiators, etc.). The curve shown in FIG. 5b is given only as an example. After 5 P.M. or on weekends the control sequence is changed according to elapse of a predetermined time $P_t$ (cycle #2). A time relay 2 through its outlet (12) switches an outside temperature control signal to OATR 5. As soon as it happens, the very first outside air temperature signal $S_1$ is then used as a basic signal $S_B=S_1$ (4) during an entire following cycle of operation (see also FIG. 4). The cycle of operation (cycle #2) in this example is considered to be from 5 P.M. to 8 A.M. on weekdays or from midnight of one day to midnight of the next day on weekends. As it was stated earlier, for buildings without mechanical ventilation or without intensive use of mechanical ventilation means the standard control sequence should not be used at all and thus, the cycle of operation will always start at midnight of one day and end at midnight of the other day (FIG. 4). For these particular cases the entire control system is simplified and does not include a time relay. So the signal from the momentary outside air temperature sensor 1 is directly sent to the one of the inlets of OATR 5 (FIG. 5a). The first outside air temperature signal is directed to the first inlet (6) of Oscillation Amplitude Temperature Reducer 5. This signal then goes through internal connection (14) of OATR to its element 7 where it is memorized and stored for a future use in cycle. Simultaneously, the same signal $S_B$ through the OATR outlet (17) is sent to the water temperature controller 3. This basic signal is sent from the outlet of OATR 5 to the inlet of water temperature controller 3 only one time in a cycle. After this signal is sent out of the OATR, the first inlet 6 of OATR 5 remains closed for signal reception during entire time of a cycle. Each next signal 13 is sent from the momentary outside air temperature sensor 1 through the outlet (12) of time relay 2 and is directed to the second inlet (8) of OATR 5. And then through the internal connection (15) of OATR 5 this signal is sent into the summator 10 of OATR 5.

In summator 10 of OATR 5 a magnitude of the control signal $S_{C.S.}$ is calculated according to following formula:

$$S_{C.S.} = \frac{S_B + S_n}{K}, \quad (1)$$

where: $S_B$—first (basic) outside air temperature signal in considered cycle: $S_n$—each of the next outside air temperature signal; K—reducing factor which is relevant to the building thermal response.

The last control signal in cycle $S_{L.C.S.}$ is calculated as $$S_{L.C.S.} = \frac{S_B + S_L}{K}, \quad (2)$$

where: $S_L$—last outside air temperature signal from momentary outside air temperature sensor 1 in considered cycle.

The reducing factor K substitutes the momentary outdoor air temperature for its converted value in proportion to the ratio of the design outdoor air temperature oscillation amplitude to its decreased value. This reducing factor is applied due to the building thermal response to minimize room air temperature departure from its design value.

The calculated in summator 10 signal is then, through the outlet (16) of OATR 5, is sent to the inlet of water temperature controller 3.

The standard (existing) control sequence is usually implemented following continuous momentary outside air temperature measurements.

However, for developed control sequence there is not need to provide a continuous input of outside air temperature signal to the OATR 5. On one hand, the outside air temperature changes relatively slowly over the time. On the other hand, a space heating system has some thermal inertia time.

The periodicity with which signal should be sent from a momentary outside air temperature sensor 1 to the OATR 5 may be determined based on the total space heating system inertia time, including hot water boiler inertia time (time necessary to change a boiler hot water temperature from its current value to a required one) and piping system inertia time (time necessary for hot water to travel from a boiler to the most distant building space heating unit).

In average, the space heating system thermal inertia time makes up a few minutes. Therefore, the outside air temperature input signal with periodicity (time interval) equals to, for example, one-two minutes, should be provided for developed control sequence. This is also done by OATR 5. Inside of defined time interval the outlet signal from OATR 5 to water temperature controller 3 remains unchanged.

The following example demonstrates the Oscillation Amplitude Temperature Reducer operation. The assumption is made that periodicity (time interval) of outside air temperature input signal equals to one minute. It means that outside air temperature signal is measured only once in a minute and stays unchanged over that time interval. Suppose that outside air temperature at the moment of switching from the standard control sequence to the developed one was 25° F. (basic signal). Suppose also, that during next three minutes it drops each minute gradually by 10° F. (such a big magnitude of outside air temperatures change is not real, but only conditionally assumed for this example). The reducing factor K for this example assumed to be equal two (K=2). According to water temperature controller curve shown in FIG. 5b the boiler supply hot water temperature at 25° F. should be maintained at 145° F. Next minute the outside air temperature measured by sensor 1 goes down to 15° F. (25° F.−10° F.=15° F.). In summator 10 of OATR 5 the value of outside air temperature is converted to (25+15)/2=20° F. (following formula (1)).

The boiler supply hot water temperature changes respectively to 152° F. (FIG. 5b). Next minute outside air temperature goes down to 5° F. (15° F.−10° F.=5° F). In summator 10 value of outside air temperature is converted to (25+5)/2=15° F. The boiler supply hot water temperature changes respectively to 161° F. (FIG. 5b). Finally, the outside air temperature drops to −5° F. (5° F.−10° F.=−5° F). In summator 10 this temperature is converted to (25+(−5))/2=10° F. The boiler supply hot water temperature changes to 170° F. (FIG. 5b). Following the standard control sequence and according to the water temperature controller curve of FIG. 5b the boiler supply hot water temperature at −5° F. should be 195° F. Thus, from the comparison of supply hot water boiler temperature values (for standard and developed control sequences) one can see the importance of considering a building unsteady state heat mode.

Figure 6:
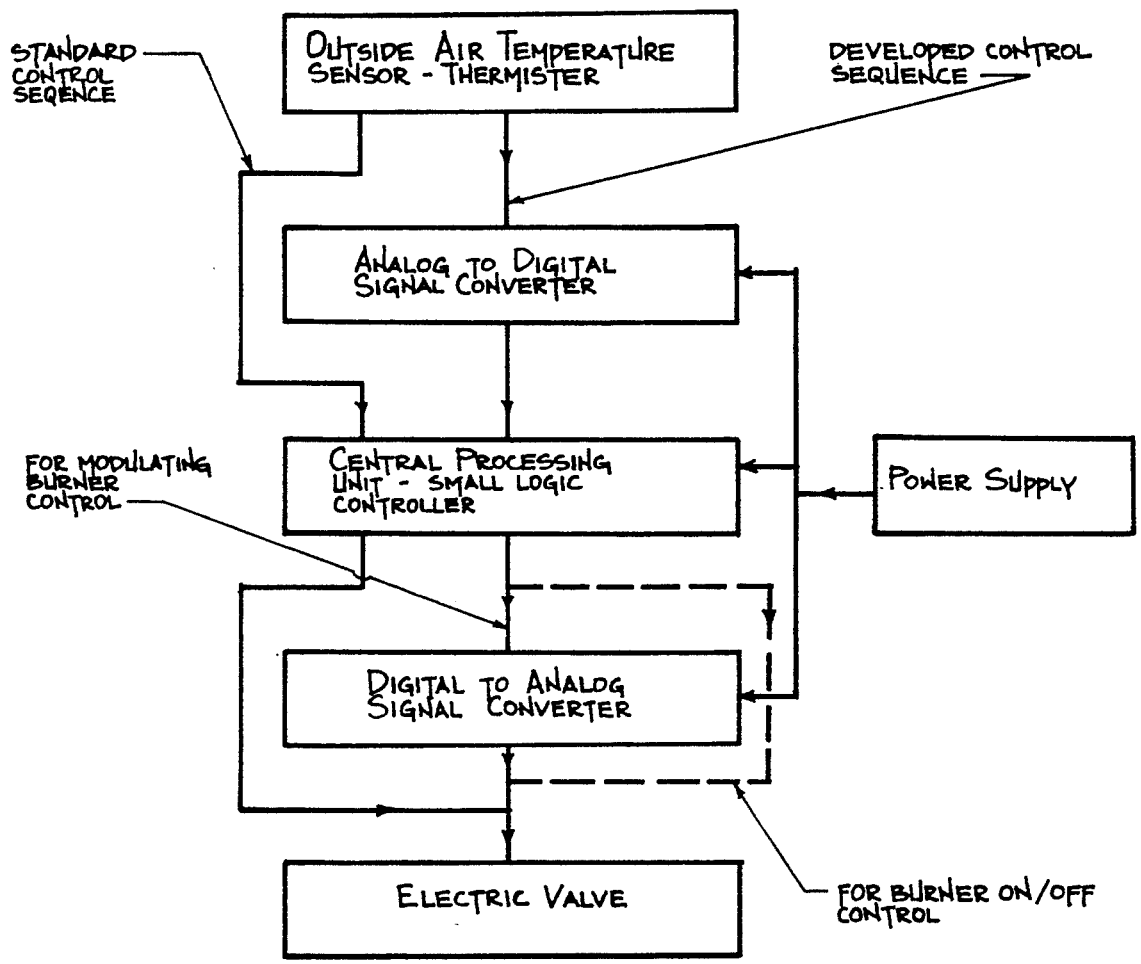
FIG. 6 shows the Schematic Apparatus Control Implementation of Present Invention.

Developed space heating control sequences shown in FIG. 5a can be implemented by using a standard control devices. In FIG. 6 the example of possible apparatus implementation of the developed control sequence is shown. All devices are manufactured by Allen-Bradley Rockwell International Company (USA). Under a standard control sequence a signal from a momentary outside air temperature sensor is sent to a Central Processing Unit and then to Electric Valve. Under the developed control sequence a signal from a momentary outside air temperature sensor is sent to an Analog to a Digital Signal Converter and then to a Central Processing Unit. From Central Processing Unit a signal is sent either to Electric Valve for on/off burner control (in FIG. 6 shown by dashed line) or to a Digital to Analog Signal Converter and then to Electric Valve for modulating burner control (in FIG. 6 shown by solid line).

Although the description of preferred embodiment of this invention is made relatively to a hot water boiler, it is obvious that suggested control method can be used more broadly. For example, the same control strategy can be applied for steam boilers. The only difference is, that the signal from outside air temperature converter will be used to change the boiler outlet steam pressure (for saturated steam). If boiler generates superheated steam, the signal from outside air temperature converter may be used to change the degree of steam superheating, etc.

The other possible field of application of present invention is reset water temperature control for district heating and district cooling systems as well as for central chillers which provide chilled water for building's air conditioning system.

Naturally, the introduced method which has been described earlier may be modified in numerous ways while still remaining in the scope of this invention.

Having explained the invention what I claim as new is:

1. The heat control of hot water boiler for space heating system having supply and return hot water line and space heating units and a pump to circulate hot water through the building hot water line and space heating units and serving one or more buildings with or without room temperature control thermostats, said heat control having a water temperature sensor for determining the boiler supply hot water temperature and an outside air temperature sensor for determining a momentary outside air temperature to represent building steady state heat mode when building heat losses follow to said momentary outside air temperature, said heat control having the outside air temperature converter connected in series to outside air temperature sensor to represent building unsteady state heat mode when building heat losses do not follow to said momentary outside air temperature, said heat control having a time relay responsible for switching control from a momentary outside air temperature sensor to the outside air temperature converter, said heat control having a water temperature controller responsive to the difference existing between a set boiler supply hot water temperature and the outside air temperature, said heat control having a control valve to change a fuel delivery rate to the boiler's burner, said boiler hot water supply temperature changes inversely to outside air temperature, measured by said momentary outside air temperature sensor of steady state heat mode and/or measured by said momentary outside air temperature sensor and then converted by said outside air temperature converter of unsteady state heat mode, so a higher boiler hot water supply temperature is maintained at lower outside air temperature, said hot water boiler supply temperature change is achieved by changing a boiler's burner fuel delivery rate through a said control valve proportionally to a difference existing between a set hot water boiler supply temperature and outside air temperature.

2. The heat control of claim 1 comprises the steps of:
(i) permanently during a steady state heat mode generating a first signal representative a momentary outside air temperature, the said temperature is measured by said outside air temperature sensor, the said first signal is sent to said water temperature controller, the said water temperature controller generates a resultant signal proportional to the difference existing between a set boiler supply water temperature and a momentary outside air temperature;
(ii) periodically during an unsteady state heat mode generating a first signal representative a momentary outside air temperature (base temperature), the said temperature is measured by said outside air temperature sensor, the said first signal is sent to said outside air temperature converter, the said outside air temperature converter sends the said first signal to said water temperature controller, the said water temperature controller generates a resultant signal proportional to the difference existing between a set boiler supply water temperature and a momentary outside air temperature;
(iii) periodically during an unsteady state heat mode generating a second (third . . . next . . . last) signal representative a momentary outside air temperatures, the said temperature is measured by said outside air temperature sensor and then determining a corresponding summation signal, the said summation signal is generated by said outside air temperature converter as an algebraical sum of a first signal (base temperature signal) of step (ii) and correspondingly a second (third . . . next . . . last) signal and the said summation signal is sent to said water temperature controller, the said water temperature controller generates a resultant signal, the said resultant signal is proportional to the difference existing between a set boiler supply water temperature and outside air temperature represented by each of corresponding summation signal.

3. The heat control of claim 2 wherein the said outside air temperature converter (oscillation amplitude temperature reducer) is a device having two signal inlets and two signal outlets and also a memory element, time program element and summation element, the said outside air temperature converter receives through its first inlet the base temperature signal from momentary outdoor air temperature sensor, memorizes it in said memory element and stores it over the entire unsteady state heat mode, and then through its first outlet sends this signal to water temperature controller, the said first outlet is controlled automatically by a time program element which allows only one signal to get through it over the entire unsteady state heat mode, the said outside air temperature converter receives through its second inlet a second, third . . . and last temperature signal from momentary outdoor air temperature sensor and implements a signal summation with predetermined reducing factor and generates a summation signal and the said outside air temperature converter through its second outlet sends a summation signal to water temperature controller, the said signal summation procedure is implemented periodically and controlled automatically by a time program element.

4. The heat control of claim 3 wherein the outside air temperature converter is implemented with the predetermined reducing factor, the said reducing factor changes the momentary outdoor air temperature signal of unsteady state heat mode to its converted value proportionally to the ratio of the design outdoor air temperature oscillation amplitude to its decreased value due to the building unsteady state heat mode.

5. The heat control of claim 1 wherein the steady state heat mode and/or the unsteady state heat mode is automatically switched by time relay from said steady state heat mode to said unsteady state heat mode and then to said steady state heat mode again and etc. or from one said unsteady state heat mode to the next unsteady state heat mode and etc. as a function of a predetermined time program.

6. The heat control of claim 1 wherein the water temperature controller sends the analog or digital signal proportional to a difference between a set hot water boiler supply temperature and outside air temperature to electric valve, the said electric valve changes the boiler's burner fuel delivery rate proportionally to the said signal, the said analog or digital signal is generated respectively for modulating or on/off burner control.

* * * * *